United States Patent
Sol et al.

(10) Patent No.: US 6,734,396 B2
(45) Date of Patent: May 11, 2004

(54) HEATABLE VEHICLE WINDOW WITH DIFFERENT VOLTAGES IN DIFFERENT HEATABLE ZONES

(75) Inventors: Jean-Marc Sol, Thionville (FR); Herve Lagrue, Thionville (FR)

(73) Assignee: Centre Luxembourgeois de Recherches pour le Verre et la Ceramique S.A. (C.R.V.C.), Grand Duche de Luxembourg (LU)

( * ) Notice: Subject to any disclaimer, the term of this patent is extended or adjusted under 35 U.S.C. 154(b) by 127 days.

(21) Appl. No.: 09/948,092

(22) Filed: Sep. 7, 2001

(65) Prior Publication Data

US 2003/0116551 A1 Jun. 26, 2003

(Under 37 CFR 1.47)

(51) Int. Cl.⁷ .................................................. B60L 1/02
(52) U.S. Cl. ........................ 219/203; 219/541; 219/219; 52/171.2
(58) Field of Search ................................ 219/203, 541, 219/522, 219, 543, 546; 392/433, 438, 439; 52/171.2; 15/250.05, 250.06

(56) References Cited

U.S. PATENT DOCUMENTS

| | | |
|---|---|---|
| 3,790,745 A | 2/1974 | Levin |
| 3,792,232 A | 2/1974 | Zarenko |
| 3,794,809 A | 2/1974 | Beck et al. |
| 3,893,234 A | 7/1975 | Levin |
| 3,982,092 A * | 9/1976 | Marriott .................... 219/203 |
| 4,543,466 A | 9/1985 | Ramus |
| 4,782,216 A | 11/1988 | Woodard |
| 4,820,902 A | 4/1989 | Gillery |
| 4,894,513 A | 1/1990 | Koontz |
| 4,902,875 A | 2/1990 | Koontz |
| 4,940,884 A | 7/1990 | Gillery |
| 5,182,431 A | 1/1993 | Koontz et al. |
| 5,213,828 A * | 5/1993 | Winter et al. ............... 219/522 |
| 5,229,205 A | 7/1993 | Nietering |
| 5,414,240 A | 5/1995 | Carter et al. |
| 5,418,025 A * | 5/1995 | Harmand et al. ........... 219/543 |
| 5,434,384 A | 7/1995 | Koontz |
| 5,653,903 A | 8/1997 | Pinchok, Jr. et al. |
| 5,824,994 A | 10/1998 | Noda et al. |
| 5,877,473 A | 3/1999 | Koontz |
| 5,902,505 A * | 5/1999 | Finley ........................ 219/219 |
| 6,180,921 B1 * | 1/2001 | Boaz .......................... 219/203 |
| 6,492,619 B1 * | 12/2002 | Sol ............................. 219/203 |
| 6,559,419 B1 * | 5/2003 | Sol et al. .................... 219/203 |
| 2002/0015824 A1 | 2/2002 | Kawamoto et al. |

* cited by examiner

Primary Examiner—Henry Bennett
Assistant Examiner—Fadi H. Dahbour
(74) Attorney, Agent, or Firm—Nixon & Vanderhye P.C.

(57) ABSTRACT

A heatable vehicle window includes a bottom bus bar and a plurality of top bus bars. Voltages or electric potentials applied to the top bus bars are different, so that a first one of the top bus bars is at a given electric potential and another one of the top bus bars is at another electric potential (i.e., the voltages/potentials are offset from one another). The degree to which the top bus bar voltages/potentials are offset relative to one another is a function of the distance each respective bus bar is from the bottom bus bar across the heatable layer(s). Given a substantially continuous heatable layer(s), this can in certain example embodiments enable approximately uniform heating of the window (e.g., laminated vehicle windshield, laminated vehicle backlite, or laminated vehicle sidelite).

17 Claims, 8 Drawing Sheets

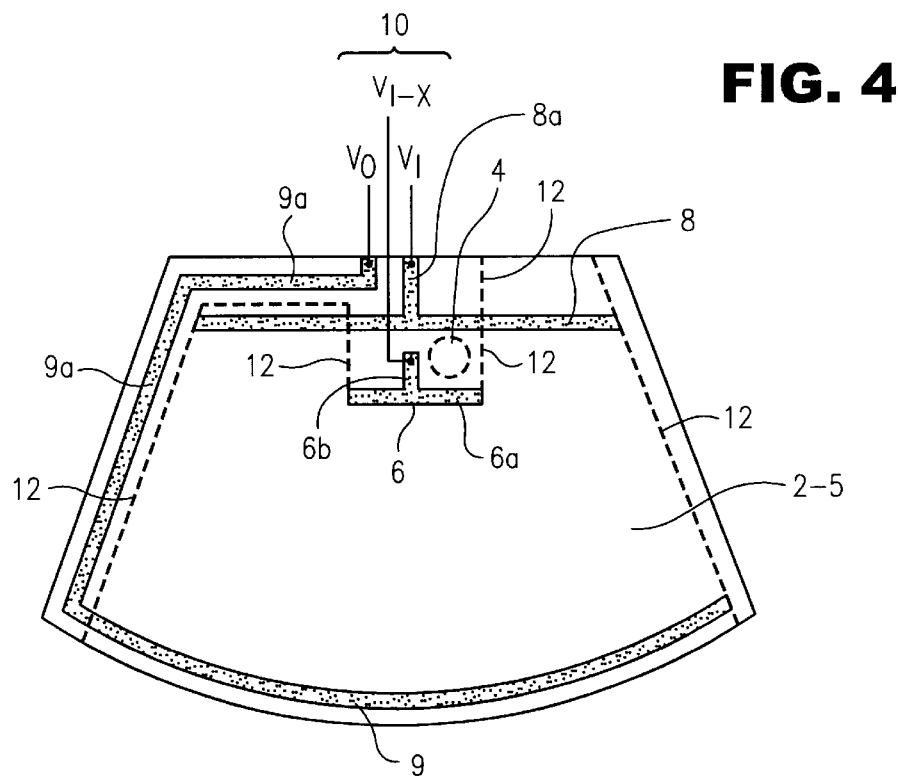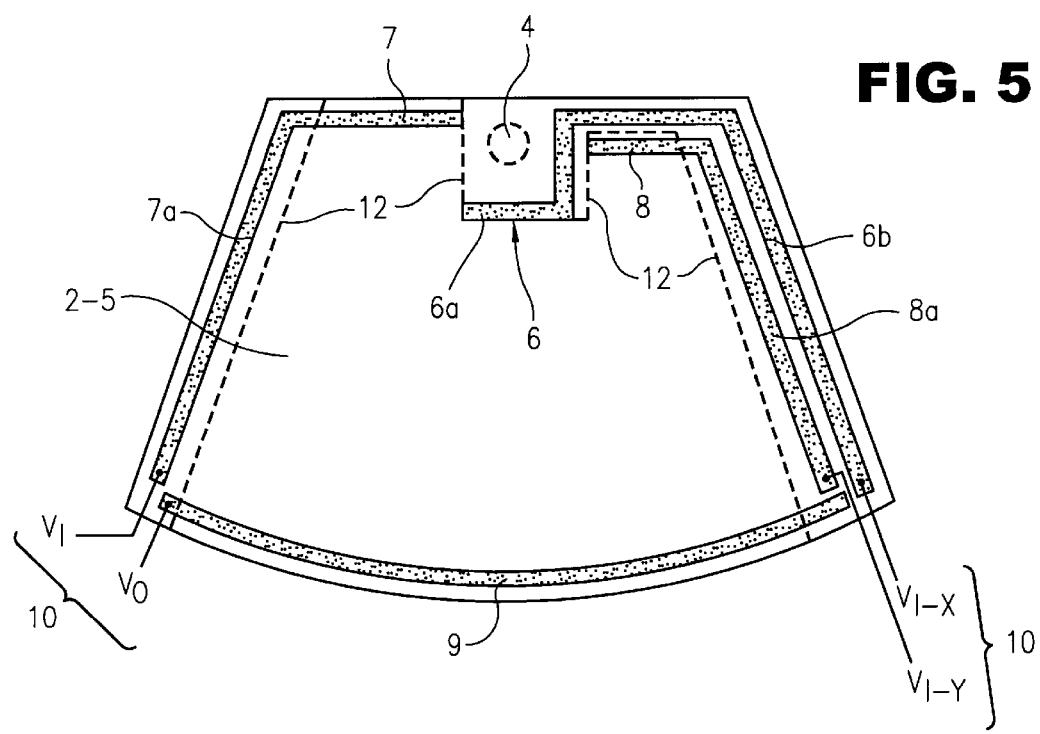

HEATABLE VEHICLE WINDOW WITH DIFFERENT VOLTAGES IN DIFFERENT HEATABLE ZONES

RELATED APPLICATION

This application relates to U.S. patent application Ser. No. 09/832,335, filed Apr. 11, 2001, the entire disclosure of which is hereby incorporated herein by reference.

This invention relates to a heatable vehicle window (e.g., vehicle windshield, backlite, or the like) including a substantially continuous heatable layer(s), wherein offset voltages or electric potentials are used to achieve approximately uniform heating.

BACKGROUND OF THE INVENTION

Heatable windows are known in the art. For example, see U.S. Pat. Nos. 3,893,234 and 5,229,205, the disclosures of which are hereby incorporated herein by reference. Conventional heatable windows for vehicles typically include first and second conductive bus bars in electrical contact with a conductive coating including an electroconductive layer. The first bus bar is usually provided at a top portion of the window, and the second bus bar at a bottom portion of the window.

Herein, the word "top" when used to describe a bus bar or conductor means that the bus bar or conductor is at least partially located in the top half of the window. Likewise, the word "bottom" means that the bus bar or conductor is at least partially located in the bottom or lower half of the window.

The electroconductive layer, at a location between the bus bars, generates heat when electric current is passed therethrough via the bus bars. In such a manner, snow and ice may be melted from vehicle windows such as windshields, backlites, sidelites, and/or the like. Windows may also be defogged in such a manner.

In recent years, devices such as rain sensors and/or toll devices have become desirable in vehicles such as cars, trucks, sport utility vehicles (SUVs), and the like. Rain sensors and/or toll devices are often mounted within the vehicle proximate a top portion of the windshield (e.g., near where rearview mirrors are sometimes located). Rain sensors and/or toll devices typically transmit and/or receive signals (e.g., infrared signals (e.g., 880 nm), RF signals, electromagnetic signals, etc.) through the windshield. Accordingly, it is undesirable to position signal inhibiting structures such as metal bus bars and/or conductive coatings in areas of a windshield through which such signals must be transmitted/received by rain sensors and/or toll devices. Unfortunately, if one were to simply modify the shape of the upper bus bar in a conventional heatable windshield to loop around the rain sensor and/or toll device area (e.g., see FIG. 2), then hot spots would tend to develop at corners/curved areas of the upper bus bar as the windshield is heated (i.e., the current flow is not approximately uniformly distributed).

In view of the above, it will become apparent to those skilled in the art that there exists a need in the art for a heatable window design which enables current flow to be approximately uniformly distributed and/or which enables approximately uniform heating of the window, so as to reduce the likelihood of overheating and enable efficient heating of the window.

SUMMARY OF THE INVENTION

An object of this invention is to provide an efficient bus bar arrangement for a heatable vehicle window (e.g., windshield, sidelite, or backlite).

Another object of this invention is to provide a heatable vehicle window including a bottom bus bar and a plurality of top bus bars. Voltages or electric potentials applied to the top bus bars are offset or different, so that a first one of the top bus bars is at a given electric potential and another one of the top bus bars is at a different electric potential (i.e., the voltages/potentials are offset from one another). The degree to which the top bus bar voltages are offset relative to one another is a function of the distance each respective top bus bar is from the bottom bus bar across the heatable layer(s). Given a substantially continuous heatable layer(s), this enables approximately uniform heating of the window.

Another object of this invention is to provide a heatable window design which is capable of accommodating a rain sensor and/or toll device coating deletion area, without being susceptible to a high likelihood of significant overheating.

Another object of this invention is to fulfill one or more of the above-listed objects.

Generally speaking, certain example embodiments of this invention fulfill one or more of the above-listed needs or objects by providing a vehicle window comprising:

a conductive layer supported by a substrate;

wherein a first voltage V1 is applied across the conductive layer via first and second bus bars, and a second voltage V2 is applied across the conductive layer via said first bus bar and a third bus bar; and wherein the second bus bar is spaced further across said conductive layer from said first bus bar than is said third bus bar, and wherein V1>V2.

In certain preferred example embodiments, the first and second voltages V1 and V2 are selected in accordance with equation of d2/d1=V2/V1, where d1 is a distance across the conductive layer between the first and second bus bars, and d2 is a distance across the conductive layer between the first and third bus bars.

In other embodiments, the instant invention fulfills one or more of the above listed needs and/or objects by providing a heatable vehicle window comprising:

first and second substrates laminated to one another via at least one polymer inclusive interlayer;

a coating including at least one heatable conductive layer supported by said first substrate and extending across at least a portion of a viewing area of the window;

a bottom bus bar and first and second different top bus bars, each of said bottom and top bus bars being in electrical communication with said at least one heatable conductive layer; and wherein first and second different voltages are applied to said heatable conductive layer via said first and second top bus bars, respectively, in order to heat said heatable conductive layer.

In other example embodiments, the instant invention fulfills one or more of the above-listed needs by providing a method of heating a vehicle window including first and second substrates laminated to one another via at least one interlayer, with at least one heatable conductive layer supported by said first substrate, the method comprising:

applying different voltages across said conductive layer via first and second different bus bars in order to heat at least part of the vehicle window.

This invention will now be described with respect to certain example embodiments thereof as illustrated in the following drawings, wherein:

IN THE DRAWINGS

FIG. 4 is a top plan view of a heatable vehicle windshield according to yet another exemplary embodiment of this invention (absent opaque shielding layers for purposes of illustration simplicity).

FIG. 5 is a top plan view of a heatable vehicle windshield according to still another exemplary embodiment of this invention (absent opaque shielding layers for purposes of illustration simplicity).

DETAILED DESCRIPTION OF CERTAIN EXEMPLARY EMBODIMENTS OF THE INVENTION

Figure 1:
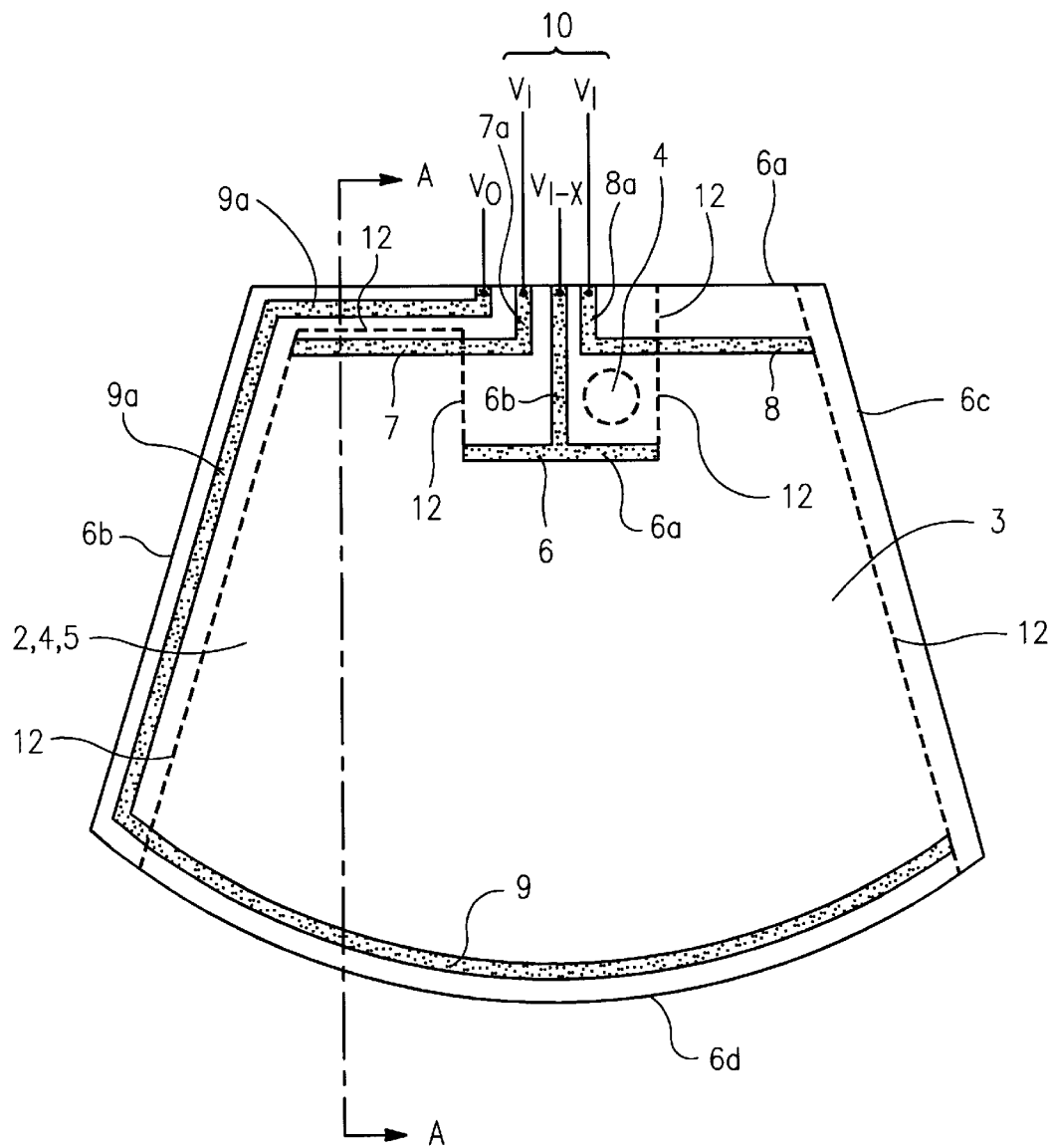
FIG. 1 is a top plan view of a heatable vehicle windshield according to an exemplary embodiment of this invention (absent opaque shielding layers for purposes of illustration simplicity).

Referring now more particularly to the accompanying drawings in which like reference numerals indicate like parts or layers throughout the several views.

Generally speaking, certain embodiments of the instant invention relate to a heatable vehicle window (e.g., windshield, backlite, or side window) which is heated using a plurality of different bus bars. Different sets of bus bars are spaced different distances from one another across a heatable coating or conductive layer(s). Different voltages are applied across the heatable conductive layer via the different sets of bus bars, respectively. The difference in voltage utilized by the different bus bar sets is a function (direct or indirect) of the difference in distance "d" across the conductive layer(s) between the opposing bus bars of each set. As a result, approximately uniform heating of the conductive layer may be achieved.

Figure 8:
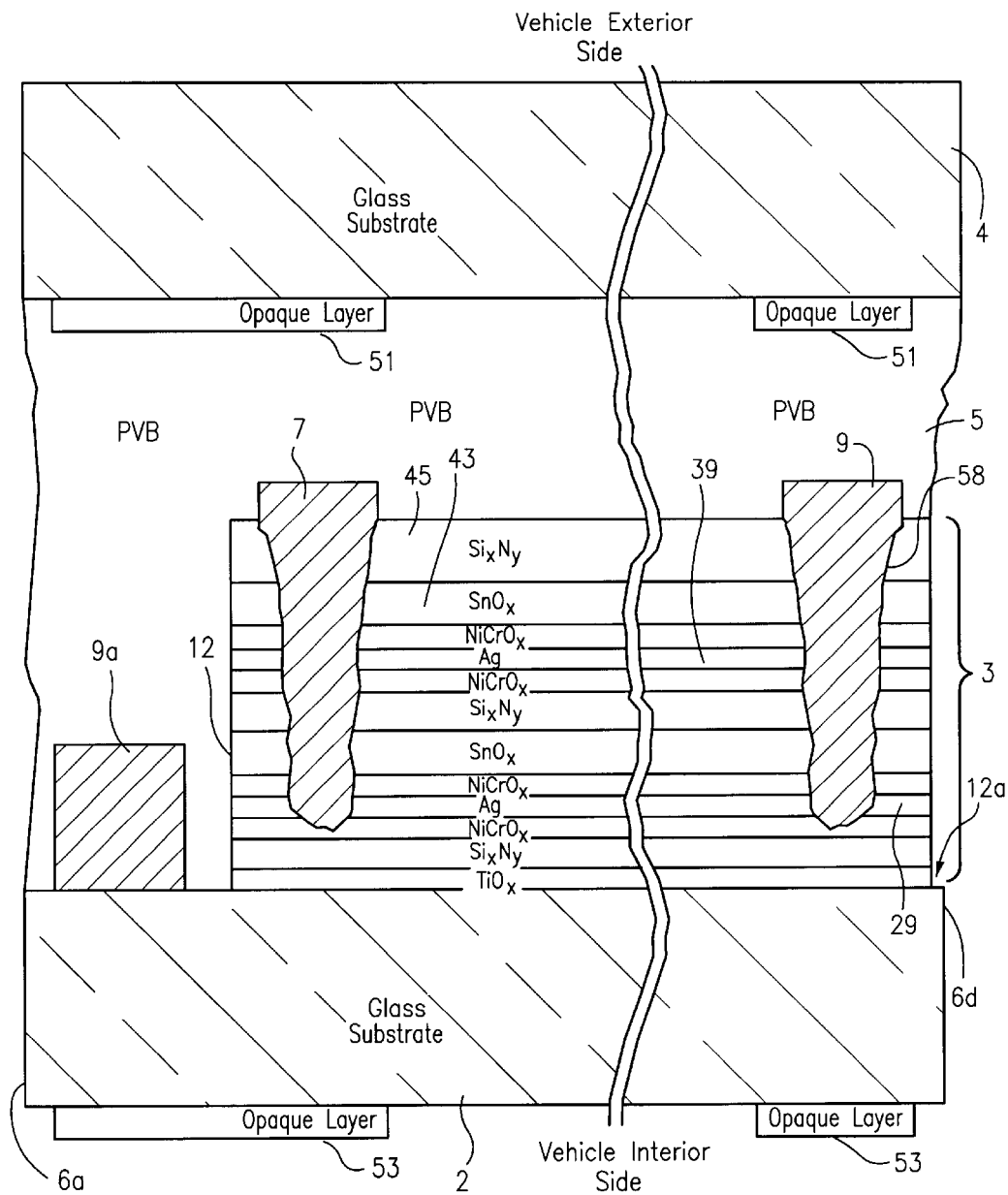
FIG. 8 is a side cross sectional view of the vehicle window of FIG. 1 (taken along Section Line A—A in FIG. 1), after the FIG. 7 structure has been laminated to another glass or plastic substrate with a polymer (e.g., PVB) inclusive interlayer provided therebetween to complete a vehicle windshield or other vehicle window.

FIG. 1 illustrates an example embodiment of this invention (opaque shielding layers are omitted from FIG. 1 of purposes of illustration simplicity). FIG. 8 is a side cross sectional view of the window of FIG. 1, taken along section line A—A. Referring to FIGS. 1 and 8, the exemplary vehicle window includes coating 3 sandwiched between first and second glass substrates 2 and 4, respectively. Coating 3 may be a single layer coating (e.g., of conductive silver or ITO) in certain embodiments, or alternatively may be a multi-layer coating in other embodiments of this invention such as that shown in FIG. 8. After being deposited, coating 3 is at least partially deleted from the windshield via deletion lines 12, so that for example the coating 3 is removed in certain edge areas of the windshield. This deletion of coating 3 may be done via laser deletion, sand-blasting deletion, a deleting abrasive wheel or disk, or any other suitable coating deletion technique/device. Optionally, coating 3 may be deleted via deletion lines 12 in an upper central area of the window where a toll device or rain sensor 4 is to be located.

Still referring to FIGS. 1 and 8, polyvinyl butyral (PVB) inclusive interlayer 5 is provided between substrates 2, 4 for conventional lamination purposes. Interlayer may be substantially transparent to visible light in certain embodiments, and may be tinted. According to certain embodiments, coating 3 is provided on the interior surface of one of substrates 2, 4 so that the coating is provided on what is known conventionally as the windshield's #2 or #3 surface (it is on the #3 surface in FIG. 8, i.e., the third substrate surface from the exterior of the vehicle). The window or windshield illustrated in FIG. 1 includes top edge 6a, side edges 6b, 6c, and bottom edge 6d.

Bottom conductive bus bar 9 is provided at least partially at a bottom portion of the window. Meanwhile, a plurality of top conductive bus bars 6, 7, and 8 are provided at least partially at a top area of the window. Each of bus bars 6–9 is in electrical communication with heatable conductive layer(s) of coating 3, so that when current is run through the conductive layer(s) via bus bars 6–9, the conductive layer generates heat in order to heat at least part of the window. Bus bars 6–9 may be of or include any suitable conductive material including but not limited to substantially transparent indium-tin-oxide (ITO), opaque copper (Cu), gold (Au), or the like.

Figure 3:
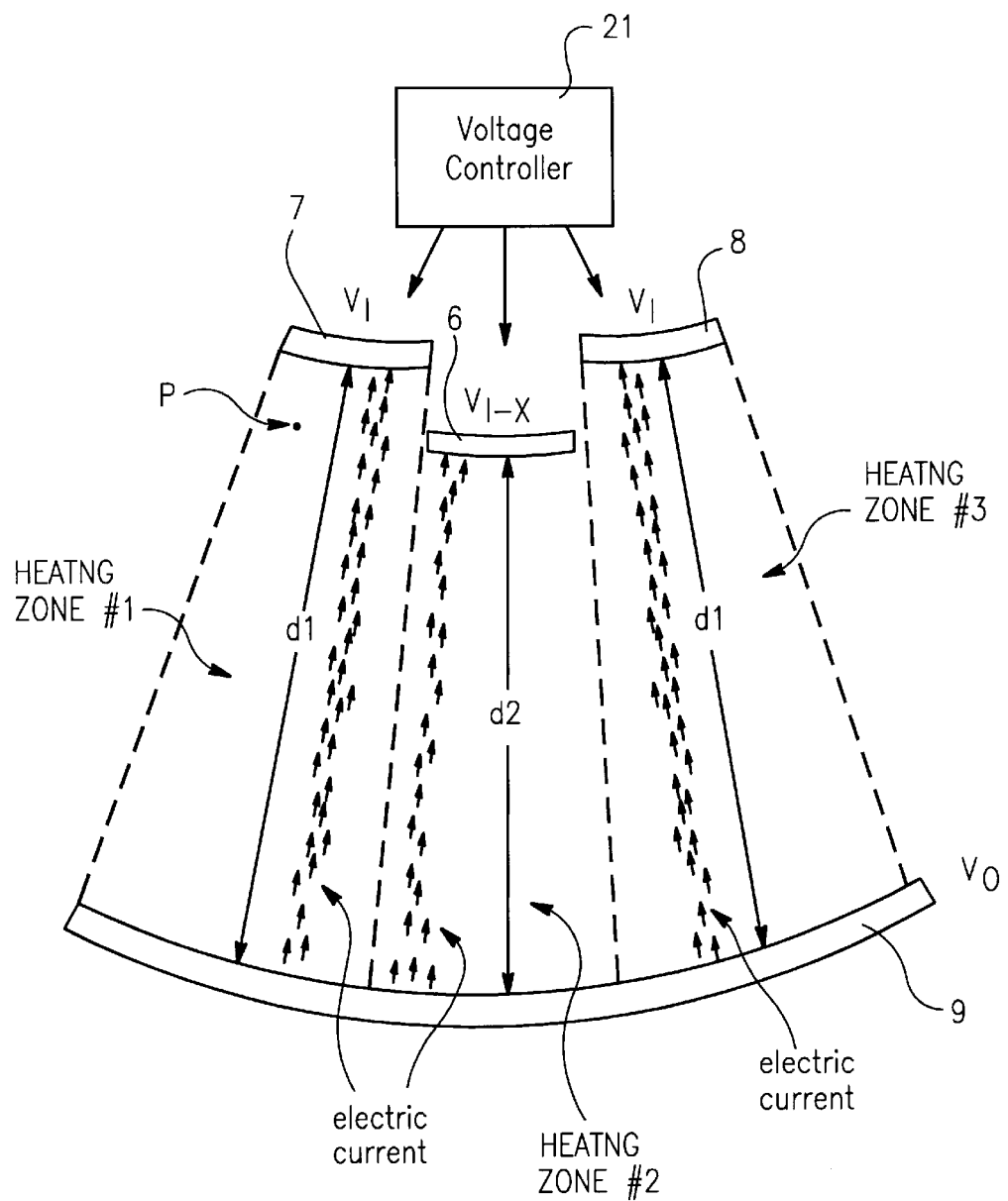
FIG. 3 is a schematic illustration of approximately uniform current distribution resulting from the design of FIG. 1 (more uniform current distribution and heating than in FIG. 2).

Different heating zones are defined between bottom bus bar 9, and the plurality of top bus bars 6, 7, and 8, respectively. In other words, as shown in FIGS. 1 and 3, a first heating zone (heating zone #1) is defined across conductive layer(s) of coating 3 between top bus bar 7 and bottom bus bar 9. A second heating zone (heating zone #2) is defined across conductive layer(s) of coating 3 between top bus bar 6 and bottom bus bar 9. Finally, a third heating zone (heating zone #3) is defined across conductive layer(s) of coating 3 between top bus bar 8 and bottom bus bar 9. Each heating zone has its own set of opposing bus bars (i.e., heating zone #1 includes opposing bus bars 7 and 9, heating zone #2 includes opposing bus bars 6 and 9, etc.).

Figure 9:
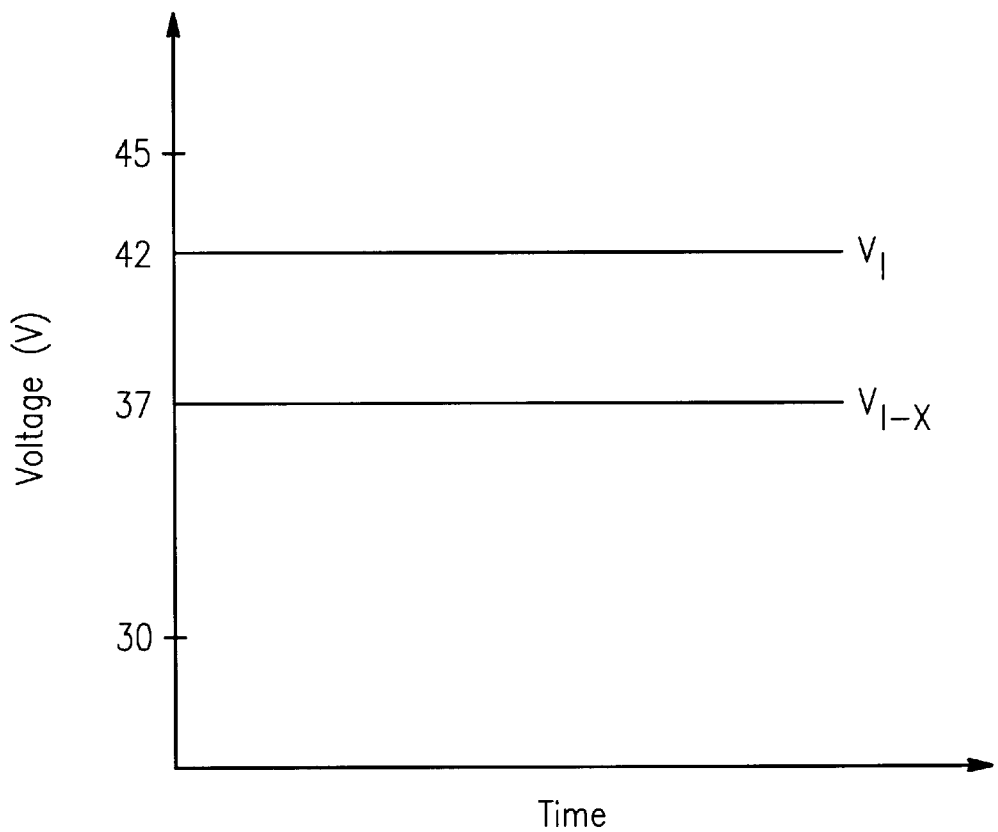
FIG. 9 is a time versus voltage graph illustrating that different voltages are applied via different bus bars in an example embodiment of this invention.

Referring to FIGS. 1, 3, and 9, different voltages may be utilized in the different heating zones. For example, bus bars 7 and 8 may be utilized to apply a first voltage $V_1$ across conductive layer(s) of coating 3. Meanwhile, bus bar 6 may be utilized to apply a different voltage $V_{1-x}$ across the same conductive layer(s) of continuous coating 3. The difference in these voltage values (i.e., the value of "x") is a function of how much closer in distance bus bar 6 is to bottom bus bar 9, than respective bus bars 7 and/or 8 are to bus bar 9. This concept will be explained in more detail below.

Referring to FIG. 1, a connector(s) 10 is provided for each bus bar 6–9. As shown in FIG. 1, in this example embodiment all connectors 10 are located in approximately the same area along a top edge 6a of the window. This, or course, requires that bottom bus bar 9 include an extension portion 9a leading up an insulated side area of the window where coating 3 has been deleted to a top portion of the window. An advantage of this design is that all connector(s) 10 may be located in approximately the same location. However, the invention is not so limited, and alternatively, the connectors 10 may be located in different locations. For example, all bus bars may have leads/extensions extending to a bottom area of the window, or to a side area or corner of the window. Still further, bus bars 6–8 may have leads/extensions leading to the top edge of the window, while bottom bus bar 9 has a lead/extension leading to the bottom edge of the window.

Figure 2:
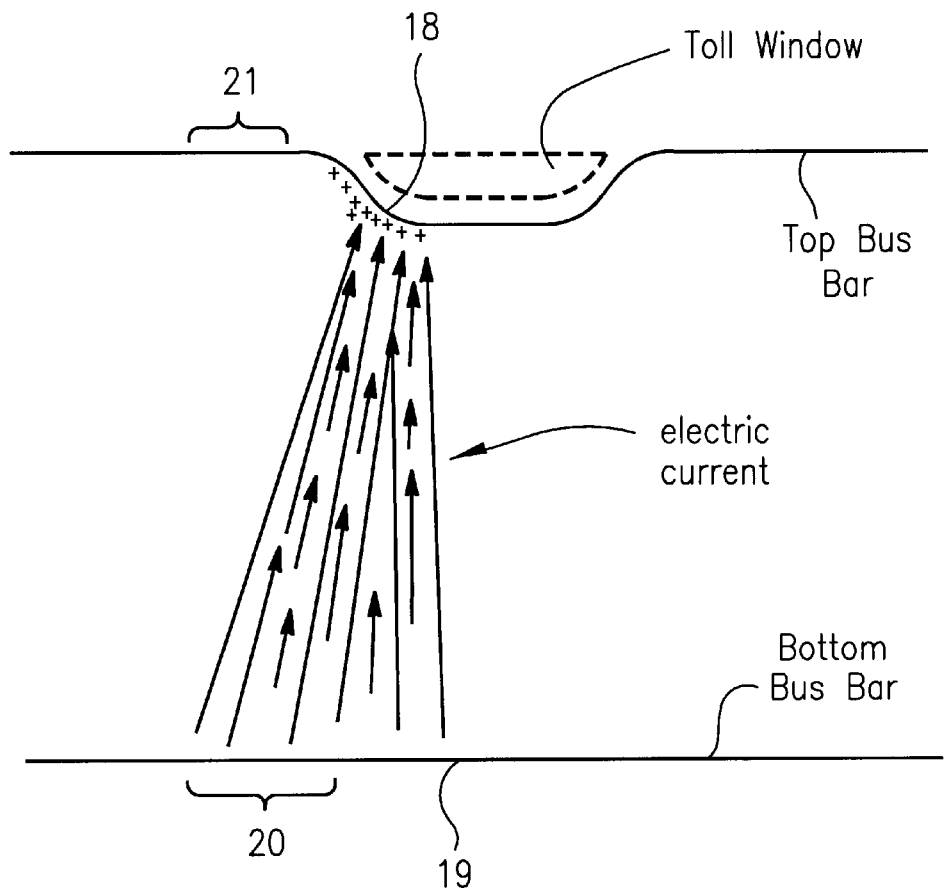
FIG. 2 is a schematic illustration of a heatable vehicle windshield where the top bus bar of a conventional windshield is simply wound around a rain sensor and/or toll device coating deletion area (this drawing is provided for comparative purposes).

Referring to FIGS. 1–3 and 9, it will be explained how the use of different voltages via different bus bars across conductive layer(s) of coating 3 may be utilized to create a more uniform heating than the comparative FIG. 2 design. FIG. 2 (provided for comparative purposes only) is a schematic diagram of a conventional window, except that the top bus bar is simply looped around a toll window deletion area where the coating has been deleted. Unfortunately, hot spots (i.e., overheating) tend to form given the FIG. 2 design at the angled portion 18 of the top bus bar because current flows thereto across the conductive coating not only from portion 19 of the bottom bus bar directly across from portion 18, but also diagonally from laterally spaced area 20 of the bottom bus bar. In FIG. 2, current flows to angled portion 18 of the top bus bar from laterally offset area 20 of the bottom bus bar because 1) there is an electrically conductive path between the two via coating 3, and 2) this path is shorter than a path from area 20 directly across the coating 3 to area 21. The overheating and/or non-uniform heat generation in the FIG. 2 design may be undesirable in certain instances.

In contrast, referring to FIGS. 1 and 3, certain embodiments of the instant invention allow room for the toll device or rain sensor 4 yet do not suffer from significantly non-uniform heating. In particular, three different bus bars 6–8 are provided at a top area of the window across the coating 3 from bottom bus bar 9. Central top bus bar 6 is much closer to bottom bus bar 9, than are bus bars 7–8. Accordingly, if a single voltage V was utilized for all top bus bars 6–8, this would result in undesirable over heating, because a disproportionally large amount of current would ten to flow to/from bus bar 6 thereby leading to hot spot(s) thereat. However, the use of a lesser voltage for bus bar 6, than for bus bars 7–8, enables heating to be more uniform.

As shown in FIGS. 1 and 3, top bus bars 7 and 8 are spaced apart from bottom bus bar 9 a distance d1 across coating 3. However, top bus bar 6 is spaced apart from bottom bus bar 9 a distance d2 across coating 3. Distance d2 is less than distance d1 (i.e., d2<d1) (see FIG. 3). Assuming that a voltage $V_1$ of 42 volts is applied across coating 3 in the first heating zone between top bus bar 7 and bottom bus bar 9, this means that in this first heating zone the electric potential at point "P" (point "P" is the same distance d1 from bottom bus 9 as is bus bar 6) is about 42 volts multiplied by d2/d1. Accordingly, this calculation may be utilized in order to determine what voltage should be applied across the coating via top bus bar 6 (which is the same distance d1 from bottom bus bar 9 as is point "P"). Using this technique, assuming that the voltage $V_1$ applied via bus bar 7 is 42 volts, and assuming that $d_1$=85 centimeters and $d_2$=75 centimeters, it can be seen that a voltage $V_{1-x}$ which may be applied across coating 3 via bus bar 6 is calculated to be about 37 volts. It is noted that in FIG. 3 the dotted lines do not represent deletion lines; instead, the dotted lines in FIG. 3 are provided only for purposes of indicating the different heating zone #s 1–3 (while in FIG. 1 the dotted lines 12 represent coating deletion lines).

Given these parameters, which are provided for purposes of example only and are not intended to be limiting, when $V_1$=42 volts and $V_{1-x}$=37 volts (i.e., x=5 volts) as shown in FIG. 9, the electric potential or specific power is approximately the same across the conductive layer of coating 3 in both the first and second heating zones. This means that, as shown in FIG. 3, current flows from the bottom bus bar 9 directly to top bus bars 6–7 in nearly the shortest available physical path (or vice versa). Given these parameters, and assuming that bus bars 7 and 8 are the same distance d1 from bus bar 9, it can be seen that according to one example embodiment of this invention, $V_1$=42 volts (for both bus bars 7 and 8), $V_{1-x}$=37 volts (for bus bar 6), and $V_0$ may equal zero volts. Alternative, given a situation where bus bars 6–8 are all spaced different respective distances from bottom bus bar 9, then each top bus bar may be used to apply a different voltage across coating 3, where the different voltages are a function of the distance each top bus bar is located from the bottom bus bar. In still other embodiments of this invention, bus bars 6–8 may be bottom bus bars, and bus bar 9 a top bus bar.

In other embodiments of this invention, assume a situation where a vehicle has the ability to supply power at only 48 volts and 36 volts. In such a scenario, 48 volts may be applied to the heatable conductive layer(s) of coating 3 via bus bars 7–8, and the location of bus bar 6 may be adjusted a distance "$d_2$" from bus bar 9 so as to enable the specific power in all three heating zones to be approximately the same when 36 volts is applied via bus bar 6. In other words, assuming that d1=85 cm, it may be calculated that bus bar 6 (given the above equation of $d2/d1=V_{1-x}/V_1$) should be located a distance d2 of about 64 cm from bottom bus bar 9.

In certain embodiments of this invention, the voltage applied to the conductive layer(s) of coating 3 via each bus bar 6–8 is constant. However, in optional or alternative embodiments of this invention, a voltage controller 21 (see FIG. 3) may be utilized to vary the voltage applied via each of the top bus bars based upon specific power measurements taken at different areas of coating 3.

In the FIG. 1 embodiment of this invention, top bus bar 6 is shaped approximately in the form of an upside down "T." In this regard, bus bar 6 includes base portion 6a which is applied over coating 3 and is in electrical communication with a conductive layer(s) thereof, as well as extension portion 6b which runs to a location proximate top edge 6a of the window where coating 3 has been deleted. Bus bars 7 and 8 are approximately "L" shaped in the FIG. 1 embodiment. Each of bus bars 7 and 8 includes an extension portion 7a, 8a located on a substrate where coating 3 has been deleted, for terminal connection purposes. Base portion 6a of bus bar 6 is approximately parallel to major portions of bus bars 7–8 in the FIG. 1 embodiment. Finally, bottom bus bar 9 includes a primary portion thereof which is provided along the bottom edge of the window as shown in FIG. 1, and also includes an extension portion 9a which extends up one or both edges of the window to a position proximate top edge 6a where a terminal connection can be made in an area where coating 3 has been deleted.

FIG. 4 illustrates another embodiment of this invention. The FIG. 4 embodiment is similar to the FIG. 1, 8 embodiment, except that the plurality of top bus bars 6 and 8 are arranged in a different manner, and top bus bar 7 has been removed. In the FIG. 4 embodiment, the major portions of bus bars 6 and 8 are approximately parallel to one another. Moreover, different spaced apart portions of elongated bus bar 8 define the first and third heating zones, with the second heating zone being provided therebetween. In this regard, elongated bus bar 8 extends across coating 3 so as to define the top of the first and third heating zones, and also extends across an area where coating 3 has been deleted (see deletion lines 12) behind bus bar 6, so that the second heating zone is vertically offset from the first and third heating zones in a top area of the window. As with the previous embodiments discussed herein, different voltages are applied via the different bus bars 6, 8 based upon their respective distances from bottom bus bar 9.

FIG. 5 illustrates yet another embodiment of this invention. The FIG. 5 embodiment is the same as the embodiments of FIGS. 1, 4 and 8, except for different bus bar arrangements. Moreover, terminal connections to bus bars 7 and 9 are made at the lower left hand corner of the window, while terminal connections to bus bars 6 and 8 are made at the lower right hand corner of the window. A top portion of bus bar 7 over coating 3 defines the top of the first heating zone, portion 6a of bus bar 6 over coating 3 defines the top portion of the central or second heating zone, and the portion of bus bar 8 over coating 3 defines the top portion of the third heating zone. Again, as with other embodiments herein, different voltages are applied to conductive layer(s) of coating 3 via bus bars 6-8, where the difference in the respective voltages is a function of the respective differences in distance "d" that each top bus bar is from the bottom bus bar 9 across coating 3.

Each of the aforesaid embodiments shown in FIGS. 1 and 3-5 is advantageous in that the window is heated in an approximately uniform manner, no coating deletion lines are required in the viewing area of the window (i.e., near the center of the window), and/or the specific power is approximately the same in all three heating zones.

Figure 6:
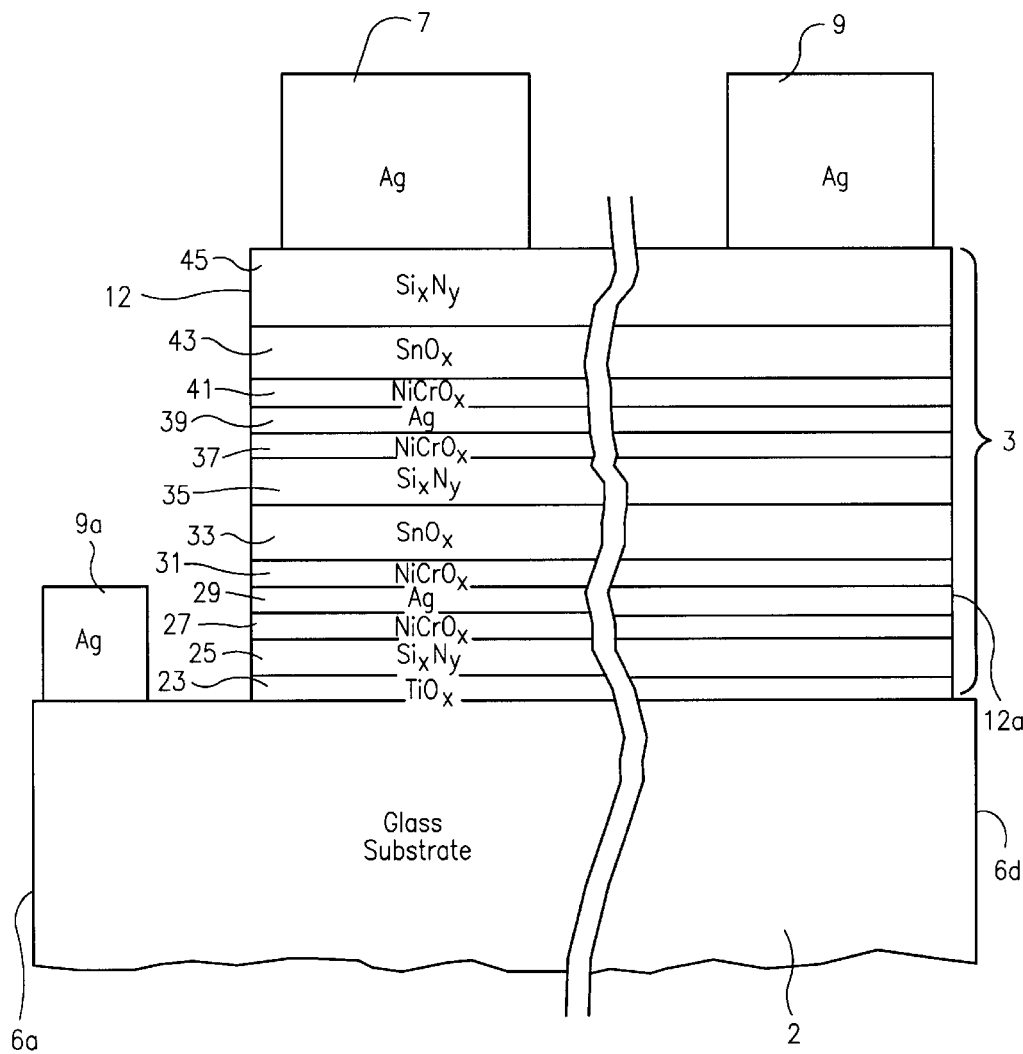
FIG. 6 is a side cross sectional view of a multi-layer coating provided on one of the substrates of the vehicle windshield of FIG. 1, with a pair of silver (Ag) frit inclusive bus bars deposited on the substrate over the coating, during the process of manufacturing the windshield of FIG. 1 (at section line A—A shown in FIG. 1).
Figure 7:
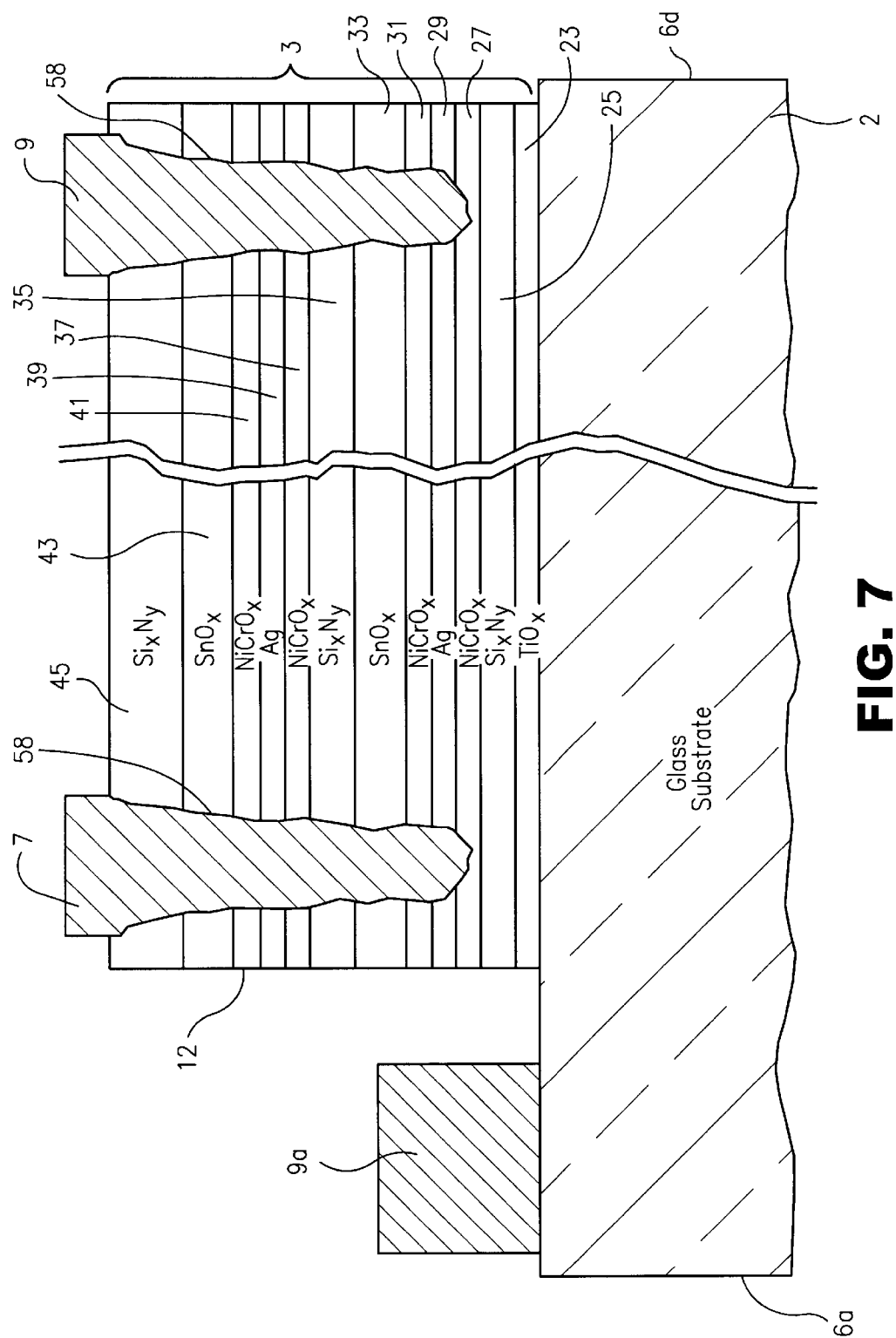
FIG. 7 is a side cross sectional view of the bus bars and coating of FIG. 6, after and/or during heating which causes at least a portion of the bus bars over the coating to bleed through at least one dielectric layer of the coating and come into contact with at least one of the electroconductive silver (Ag) layers of the coating thereby establishing an electrical connection with the same.

Referring to FIGS. 6-8, an exemplary method of making the heatable windshield(s) of FIG. 1 will now be described. The materials illustrated for the various layers in FIGS. 6-8 are for purposes of example only. Initially, float glass (e.g., soda-lime-silica glass) substrate 2 is provided. Substrate 2 is from about 1.0 to 10.0 mm thick, more preferably from about 1.6 mm to 4 mm thick. Coating 3 (including at least one electroconductive layer) is deposited on substrate 2 (a single layer Ag or ITO layer may be provided as the coating in alternative embodiments). Multi-layer coating 3 includes first dielectric anti-reflection layer 23, second dielectric haze-reducing layer 25, first lower contact layer 27 (which contacts layer 29), first electroconductive metallic infrared (IR) reflecting layer 29, first upper contact layer 31 (which contacts layer 29), third dielectric layer 33 (which may be deposited in one or multiple steps in different embodiments of this invention), fourth dielectric layer 35, second lower contact layer 37 (which contacts layer 39), second electroconductive metallic IR reflecting layer 39, second upper contact layer 41 (which contacts layer 39), fifth dielectric layer 43, and finally sixth protective dielectric layer 45. The "contact" layers each contact at least one IR reflecting layer. The aforesaid layers 23-45 make up heat treatable low-E (i.e., low emissivity) coating 3 which is provided on substrate 2. Conductive layer(s) 29 and/or 39 function to heat the window when current passes therethrough.

In certain embodiments of this invention, first dielectric layer 23 may be of or include titanium dioxide ($TiO_x$ where x is from 1.7 to 2.3, most preferably 2.0), silicon nitride ($Si_xN_y$ where x/y may be about 0.75 (i.e., $Si_3N_4$), or alternatively x/y may be from about 0.76 to 1.5 in Si-rich embodiments), silicon dioxide ($SiO_x$ where x is from 1.7 to 2.3, most preferably about 2.0), niobium oxide (e.g., $Nb_2O_5$), SiZrN, tin oxide, zinc oxide, silicon oxynitride, or any other suitable dielectric material. First dielectric layer 23 functions as an antireflection layer in certain embodiments of this invention.

Second dielectric layer 25 may function to reduce haze in certain embodiments of this invention, and is preferably of or includes silicon nitride (e.g., $Si_3N_4$, or alternatively silicon-rich silicon nitride $Si_xN_y$ where x/y is from 0.76 to 1.5, more preferably from 0.85 to 1.2). When sputtering silicon nitride layer(s) herein, a Si target may be used, or alternatively a target including Si admixed with up to 3–20% by weight aluminum and/or stainless steel (e.g. SS#316) may be used, with about this amount of aluminum and/or steel then appearing in the layer(s) so formed. Other materials may also be used for haze reducing layer 25, including but not limited to SiZrN.

While $Si_3N_4$ may be used for layer 25 (and/or layer 35) in certain embodiments, it has been found that a silicon rich type of silicon nitride as layer 25 is better at reducing haze and/or improving mechanical durability in certain embodiments of this invention. Absent this layer 25 (and/or 35), haze tends to be at least 0.45; whereas with this layer(s) it is reduced to no greater than 0.4 as discussed herein. In Si-rich silicon nitride embodiments, layer 25 (and/or layer 35) is of or includes $Si_xN_y$ where x/y is from 0.76 to 1.5, more preferably from about 0.85 to 1.2. $Si_3N_4$ has an index of refraction "n" of about 2.04, and an extinction coefficient "k" of about 0. Si-rich silicon nitride according to certain embodiments of this invention may have an index of refraction of at least about 2.05, more preferably of at least about 2.07, and may be 2.08 (at 550 and/or 632 nm) in exemplary embodiments. Also, Si-rich silicon nitride according to certain embodiments of this invention may have an extinction coefficient "k" of at least about 0.001, and more preferably of at least about 0.003. In a first monolithic example after HT of a Si-rich nitride layer, "n" was 2.099 and "k" was 0.0034; while in a second monolithic example after HT "n" was 2.168 and "k" was 0.014. Si-rich silicon nitride, in addition to being better at reducing haze than $Si_3N_4$, has also been found to adhere better to the titanium oxide of layer 23 in example embodiments. Surprisingly, it has also been found that Si-rich silicon nitride under the $NiCrO_x$ and Ag layers provides a lower sheet resistance ($R_s$).

Electroconductive (or simply conductive) infrared (IR) reflecting layers 29 and 39 are preferably metallic and conductive, and may be made of or include silver (Ag), gold, or any other suitable IR reflecting material. However, metallic Ag is the material of choice for the IR reflecting layers 29 and 39 in certain example embodiments of this invention. These IR reflecting layers help enable coating 3 to have low-E characteristics, as well as heatability.

Contact layers 27, 31, 37, and 41 are of or include nickel (Ni) oxide, or a nickel alloy oxide such as nickel chrome oxide ($NiCrO_x$), in preferred embodiments of this invention. $NiCrO_x$ layers 27, 31, 37, and/or 41 may be fully oxidized in certain embodiments of this invention (i.e., fully stochiometric), or may be at least about 75% oxidized in other embodiments of this invention. While $NiCrO_x$ is a preferred material for layers 27, 31, 37 and/or 41, those skilled in the art will recognize that other materials may instead be used (e.g., oxides of Ni, oxides of Ni alloys, oxides of Cr, oxides of Cr alloys, $NiCrO_xN_y$, or any other suitable material) for one or more of these layers. It is noted that contact layers 27, 31, 37 and/or 41 may or may not be continuous in different embodiments of this invention.

When layers 27, 31, 37 and/or 41 comprise $NiCrO_x$ in certain embodiments, the Ni and Cr may be provided in different amounts, such as in the form of nichrome by weight about 80–90% Ni and 10–20% Cr. An exemplary sputtering target for depositing these layers includes not only SS-316 which consists essentially of 10% Ni and 90% other ingredients, mainly Fe and Cr, but Haynes 214 alloy as well, which by weight consists essentially of (as a nominal composition) the following materials which may also show up in these layers:

| Element | Weight % |
|---------|----------|
| Ni | 75.45 |
| Fe | 4.00 |
| Cr | 16.00 |
| C | .04 |
| Al | 4.50 |
| Y | .01 |

One or more of contact layers 27, 31, 37, and/or 41 (e.g., of or including $NiCrO_x$) is/are preferably oxidation graded in certain embodiments of this invention so that the degree of oxidation in the layer(s) changes throughout the thickness of the layer(s). For example, one or more of contact layers (27, 31, 37 and/or 41) may be graded so as to be less oxidized at the contact interface with the immediately adjacent IR reflecting layer (29 or 39) than at a portion of the contact layer(s) further or more/most distant from the immediately adjacent IR reflecting layer. It is believed that oxidation grading of one or more of contact layer(s) enables the low-E coating 3 to achieve the combination of heat treatability and high visible transmission (which was not previously achievable using $NiCrO_x$ contact layers in a dual silver low-E coating system.

Third dielectric layer 33 acts as a coupling layer between the two halves of the coating 3, and is of or includes tin oxide in certain embodiments of this invention. However, other dielectric materials may instead be used for layer 33, including but not limited to silicon nitride, titanium dioxide, niobium oxide, silicon oxynitride, zinc oxide, or the like. Fourth dielectric layer 35 functions as a haze reducer in certain embodiments of this invention, and is preferably of or includes silicon nitride (e.g., $Si_3N_4$, or alternatively silicon-rich silicon nitride discussed above). However, in alternative embodiments of this invention, other materials (e.g., SiZrN) may instead be used for dielectric layer 35.

Fifth dielectric layer 43 may be of or include tin oxide in certain embodiments of this invention. However, other dielectric materials may instead be used for layer 43, including but not limited to silicon nitride, titanium dioxide, niobium oxide, silicon oxynitride, zinc oxide, or the like. Protective overcoat dielectric layer 45 is provided at least for durability purposes, and may be of or include silicon nitride (e.g., $Si_3N_4$) in certain embodiments of this invention. However, other dielectric materials may instead be used for layer 45, including but not limited to titanium dioxide, silicon oxynitride, tin oxide, zinc oxide, niobium oxide, SiZrN, or the like.

Other layer(s) below or above the illustrated coating 3 may also be provided. Thus, while the layer system or coating 3 is "on" or "supported by" substrate 2 (directly or indirectly), other layer(s) may be provided therebetween. Thus, for example, coating 3 of FIG. 6 may be considered "on" and "supported by" the substrate 2 even if other layer(s) are provided between layer 23 and substrate 2. Moreover, certain layers of coating 3 may be removed in certain embodiments, while others may be added in other embodiments of this invention without departing from the overall spirit of certain embodiments of this invention.

While various thicknesses may be used for the layers of multi-layer coating 3, exemplary thicknesses and example materials for the respective layers on the glass substrate 2 are as follows:

TABLE 1

Example Materials/Thicknesses for Coating 3

| Layer | Preferred Range (Å) | More Preferred (Å) | Example (Å) |
|-------|---------------------|--------------------|-------------|
| $TiO_2$ (layer 23) | 0–400 Å | 50–250 Å | 100 Å |
| $Si_xN_y$ (layer 25) | 0–400 Å | 50–250 Å | 170 Å |
| $NiCrO_x$ (layer 27) | 5–100 Å | 10–50 Å | 18 Å |
| Ag (layer 29) | 50–250 Å | 80–120 Å | 105 Å |
| $NiCrO_x$ (layer 31) | 5–100 Å | 10–50 Å | 16 Å |
| $SnO_2$ (layer 33) | 0–800 Å | 500–850 Å | 650 Å |
| $Si_xN_y$ (layer 35) | 0–800 Å | 50–250 Å | 170 Å |
| $NiCrO_x$ (layer 37) | 5–100 Å | 10–50 Å | 18 Å |
| Ag (layer 39) | 50–250 Å | 80–120 Å | 105 Å |
| $NiCrO_x$ (layer 41) | 5–100 Å | 10–50 Å | 16 Å |
| $SnO_2$ (layer 43) | 0–500 Å | 100–300 Å | 150 Å |
| $Si_3N_4$ (layer 45) | 0–500 Å | 100–300 Å | 250 Å |

In other example embodiments, dielectric layer 23 may be removed, and/or layers 23 and 25 may be replaced with a single silicon nitride layer of either $Si_3N_4$ or of the Si-rich type of silicon nitride described above.

In certain exemplary embodiments of this invention, coating/layer systems 3 according to example embodiments have the following low-E characteristics before/after heat treatment (HT) when in monolithic form, as set forth in Table 2:

TABLE 2

Monolithic Before/After Heat Treatment (HT)

| Characteristic | General | More Preferred | Most Preferred |
|----------------|---------|----------------|----------------|
| $R_s$ (ohms/sq.) (before HT): | <=10.0 | <=8.0 | <=5.0 |
| $R_s$ (ohms/sq.) (after HT): | <=8.0 | <=6.0 | <=4.0 |
| $E_n$ (before HT): | <=0.08 | <=0.06 | n/a |
| $E_n$ (after HT): | <=0.07 | <=0.05 | n/a |
| Haze (after HT): | <=0.40 | <=0.30 | <=0.28 |

An example low-E coating 3 was deposited as follows on substrate 2 using a Leybold Terra-G six-chamber sputter coating apparatus. Five cathodes were in each chamber, so there were a total of 30 cathode targets in the sputter coater. Cathode numbering utilizes the first digit to refer to the coater chamber, and the second digit to refer to the cathode position in that chamber. For example, cathode #32 was the second cathode (second digit) in the third (first digit) sputter chamber. Cathode #s C13, C14, C23, C62, C31, C32, C62, C64 and C65 were Twin Mag II type cathodes; cathode #C42 was a dual C-Mag type cathode; and cathode #s C44, C51, and C53 were planar cathodes. In the sputter coater, layers 27–31 and 37–41 were sputtered onto the substrate using DC power sputtering, while the other layers were sputtered onto the substrate using a mid-frequency AC type system. Below, "*" means Al content of approximately 10%. The line speed was 2.6 meters per minute (m/min.). All gas flows (e.g., oxygen, argon, nitrogen) are presented in units of mL/minute. In the below examples, though not shown in the charts, the oxygen flow was turned off at the sides of the NiCr targets discussed above in order to oxidation grade the contact layers 31 and 41 so that they were more oxidized further from the Ag layer(s). Volts refers to cathode volts, and amps (A) refers to cathode amps. "Tr" stands for trim; and trim (Tr) console, trim (Tr) Mid, and trim (Tr) pump are all measured in mL/minute. Pressure is measured in mbar ×10⁻³. Trim gas refers to individually adjusted gas flows along the cathode length to make corrections regarding layer thickness uniformity. The NiCr targets were approximately 80/20 NiCr. The process is broken into three separate charts (i.e., Part #s 1–3) because so much information is presented; only the cathode and target data is provided for all three charts for ease of reference. Both silicon nitride layers 25 and 35 were Si-rich through their entire thickness(es); as can be seen by the fact that much more inert argon (Ar) gas than nitrogen gas was used in sputtering these silicon nitride layers.

TABLE 3

Coater Setup/Processes for Coating 3

(Part #1)

| Cathode | Target | Volts (V) | Power (kW) | Ar Flow (mL/min) | $O_2$ (mL/min) | $N_2$ (mL/min) |
|---|---|---|---|---|---|---|
| #13 | Ti | 743 | 73 | 200 | 25 | 80 |
| #14 | Ti | 703 | 64 | 200 | 35 | 50 |
| #23 | Ti | 738 | 63.5 | 200 | 35 | 50 |
| #42 | Si* | 456 | 29.7 | 225 | 0 | 165 |
| #44 | NiCr | 370 | 4.3 | 150 | 38 | 0 |
| #51 | Ag | 432 | 3.2 | 100 | 0 | 0 |
| #53 | NiCr | 386 | 4.1 | 150 | 48 | 0 |
| #62 | Sn | 431 | 18.3 | 200 | 240 | 100 |
| #31 | Sn | 477 | 24.2 | 200 | 290 | 100 |
| #32 | Sn | 428 | 24.5 | 200 | 300 | 100 |
| #42 | Si* | 453 | 30.2 | 225 | 0 | 165 |
| #44 | NiCr | 360 | 4.2 | 150 | 38 | 0 |
| #51 | Ag | 430 | 3.2 | 100 | 0 | 0 |
| #53 | NiCr | 380 | 4.1 | 150 | 48 | 0 |
| #62 | Sn | 442 | 18.4 | 200 | 240 | 100 |
| #64 | Si* | 554 | 40.6 | 200 | 0 | 200 |
| #65 | Si* | 545 | 40.3 | 250 | 0 | 200 |

Part #2 continued from Part #1 above [cathode/target in common]

| Cathode | Target | Amps (A) | Tank Voltage (V) | Freq. (kHz) | Trim Gas | Tr Console |
|---|---|---|---|---|---|---|
| #13 | Ti | 128 | 364 | 26.7 | $O_2$ | 7.5 |
| #14 | Ti | 125 | 346 | 26.7 | $O_2$ | 12.5 |
| #23 | Ti | 110 | 344 | 26.5 | $O_2$ | 7.5 |
| #42 | Si* | n/a | 230 | 26.18 | $N_2$ | 50 |
| #44 | NiCr | 11.4 | 0 | 0 | Ar | 15 |
| #51 | Ag | 7.4 | 0 | 0 | Ar | 15 |
| #53 | NiCr | 10.7 | 0 | 0 | Ar | 15 |
| #62 | Sn | 45 | 203 | 25.03 | $O_2$ | 15 |
| #31 | Sn | 61 | 224 | 25.6 | $O_2$ | 15 |
| #32 | Sn | 60 | 225 | 25.64 | $O_2$ | 15 |
| #42 | Si* | n/a | 230 | 26.18 | $N_2$ | 50 |
| #44 | NiCr | 11.6 | 0 | 0 | Ar | 15 |
| #51 | Ag | 7.4 | 0 | 0 | Ar | 15 |
| #53 | NiCr | 10.5 | 0 | 0 | Ar | 15 |
| #62 | Sn | 42 | 208 | 25.1 | $O_2$ | 15 |
| #64 | Si* | 93.5 | 264 | 26.4 | $N_2$ | 20 |
| #65 | Si* | 93.5 | 273 | 26.2 | $N_2$ | 20 |

Part #3 continued from Parts #1-2 above [cathode/target in common]

| Cathode | Target | Tr Mid | Tr Pump | Pressure | Lambda | Lam. active |
|---|---|---|---|---|---|---|
| #13 | Ti | 15 | 7.5 | 2.79E⁻⁰³ | 252 | True |
| #14 | Ti | 25 | 12.5 | 3.03E⁻⁰³ | 252 | True |
| #23 | Ti | 35 | 7.5 | 4.83E⁻⁰³ | 252 | True |
| #42 | Si* | 5 | 45 | 2.18E⁻⁰³ | 0 | False |
| #44 | NiCr | 70 | 15 | 2.26E⁻⁰³ | 0 | False |
| #51 | Ag | 70 | 15 | 1.37E⁻⁰³ | 0 | False |
| #53 | NiCr | 70 | 15 | 2.16E⁻⁰³ | 0 | False |
| #62 | Sn | 70 | 15 | 2.12E⁻⁰³ | 220 | True |
| #31 | Sn | 70 | 15 | 2.97E⁻⁰³ | 220 | True |
| #32 | Sn | 70 | 15 | 3.19E⁻⁰³ | 220 | True |

TABLE 3-continued

Coater Setup/Processes for Coating 3

| #42 | Si* | 5 | 45 | 2.52E⁻⁰³ | 0 | False |
|---|---|---|---|---|---|---|
| #44 | NiCr | 70 | 15 | 2.30E⁻⁰³ | 0 | False |
| #51 | Ag | 70 | 15 | 1.44E⁻⁰³ | 0 | False |
| #53 | NiCr | 70 | 15 | 2.38E⁻⁰³ | 0 | False |
| #62 | Sn | 70 | 15 | 2.24E⁻⁰³ | 220 | True |
| #64 | Si* | 60 | 20 | 2.88E⁻⁰³ | 0 | False |
| #65 | Si* | 60 | 20 | 3.61E⁻⁰³ | 0 | False |

After the example of coating 3 was sputtered onto substrate 2 in accordance with the above, it was tested/measured as follows in Table 4 (i.e., in a monolithic state). Heat treatment (HT) was performed by placing the coated articles into a furnace heated to about 625 degrees C. for about five (5) minutes, for purposes of simulating heat bending and/or tempering.

TABLE 4

Coating 3 Properties Before/After Heat Treatment (HT) (Monolithic)

| Characteristic | Example of Coating 3 |
|---|---|
| $T_{vis}$, Ill. A, 2° (before HT): | >=70% |
| $T_{vis}$, Ill. A, 2° (after HT): | >=78% |
| $R_s$ (ohms/sq.) (before HT): | 4.43 |
| $R_s$ (ohms/sq.) (after HT): | 3.46 |
| $E_n$ (before HT): | <=0.06 |
| $E_n$ (after HT): | <=0.05 |
| Haze (after HT): | 0.15 |

After coating 3 has been sputtered onto substrate 2, the coating is deleted at certain areas (e.g., 4a, 4b, 4c, 4d) of the substrate 2. In the figures, dotted lines 12 are coating deletion lines. Thus, coating 3 is deleted near the left and right-hand edges of the window, and in a top area of the window inclusive of toll device or rain sensor area 4. Optionally, coating 3 may also be deleted proximate a bottom edge of the substrate as shown by numeral 12a. Referring to FIGS. 1 and 6, after coating 3 has been deleted from certain areas of substrate 2 as shown by deletion lines 12, bus bars 6–9 (e.g., of or including Ag inclusive frit or any other suitable material) are silk screen deposited/printed on substrate 2. The conductive bus bars 6–9 are deposited on the substrate 2 at least partially over coating 3 in areas where the bus bars are to be in contact with the coating so as to contact the outer coating surface. However, in areas where coating 3 has been deleted, the bus bars 6–9 are deposited directly on the substrate or alternatively on the substrate over an opaque enamel layer or the like. For example, bus bar 9 at the bottom of the window is deposited on coating 3, while extension 9a thereof is deposited directly on substrate 2 in a coating deletion area. After deposition of the bus bars 6–9, in areas where portions of the bus bars are provided over the coating 3 dielectric layers 43 and 45 of coating 3 are located between these bus bar portions and the electroconductive layers 29, 39 of coating 3. Thus, the bus bars are not in electrical contact with conductive layers 29, 39 at this time (see FIG. 6). In certain embodiments of this invention, bus bars 6–9 are each from about 2 to 30 m thick, more preferably from about 5–15 μm thick, and sometimes about 10 μm thick. Accordingly, bus bars 6–9 are much thicker than layers of coating 3 as deposited, although the drawings do not necessarily illustrate this for purposes of simplicity.

Referring to FIG. 7, the FIG. 6 structure is then heated (e.g., to a temperature of at least 400 degrees C., more preferably from about 500 to 700 degrees C.) for a period of time (e.g., at least one minute, more preferably from about 3–15 minutes) so that the bus bar portions over coating 3 become molten or at least reach a flowable semi-molten state (i.e., the transition/transformation and/or flowable temperature of bus bars 6–9 may be less than that of layers 29 and 39). In certain example embodiments, this heating may also be used for heat bending the coated article into the desired windshield shape in windshield embodiments (i.e., the bus bars flow into contact with the Ag layers of the coating during the heat bending process). In alternative embodiments, this heating may be different from any heat bending.

During this bus bar bleeding or heating step (which may or may not be performed simultaneously with heat bending), it has surprisingly been found that at least portions of molten or semi-molten bus bars 6–9 bleed/flow and/or migrate downward through at least dielectric layers 43 and 45 of coating 3 until coming into contact with conductive layer(s) 39 and/or 29 of coating 3 as shown in FIG. 7. The portions of the bus bars 6–9 extending below the surface of coating 3 (i.e., below the outer surface of layer 45) may be referred to as the run-off or bleeded portion(s) of the bus bar(s). The bus bars and/or coating may be heated to an extent such that the bus bars end up contacting only one conductive layer 39, or alternatively to an extent such that the bus bars end up contacting both conductive layers 29 and 39 of coating 3 though contact holes 58 formed in coating 3 (the contact holes 58 are formed in at least layers 41, 43 and 45 by the bleeding downward of the bus bar material). The bleeding of the bus bars 6–9 (in areas over coating 3) may or may not reach substrate 2 in different embodiments of this invention, depending upon how long and to what temperature the FIG. 6–7 structure is heated. In preferred embodiments, after this heating/bleeding step and subsequent cooling and solidifying of the bus bars 6–9, the newly formed bus bars are now in electrical contact with conductive layer(s) 29 and/or 39 as shown in FIG. 7 while still retaining their presence at the upper surface of coating 3 so that they can be in electrical contact with connectors 10. Because conductive bus bar portions 6b, 7a, 8a, and 9a are not over coating 3, significant bleeding of the same does not occur during this heating step. Connectors 10 may be attached to the bus bars 6–9 at this point in the process (i.e., before lamination to another substrate).

Referring to FIGS. 1 and 7–8, after formation of the FIG. 7 structure as described above, the FIG. 7 structure is laminated to another substrate (e.g., glass substrate) 4 via PVB layer 5 thereby resulting in the heatable windshield of FIGS. 1 and 8. Optionally, an opaque enamel layer (e.g., black or dark enamel) 51 may be provided on the interior surface of substrate 4 adjacent only relevant edge(s) thereof as shown in FIG. 8 in order to shield one or more of bus bars 6–9 from the view of persons viewing the heatable window from outside the vehicle. Also, in certain optional embodiments, an opaque enamel layer (e.g., black or dark enamel) 53 may be provided on the #4 surface of the windshield or window (i.e., on the outer surface of inner substrate 2) adjacent only relevant edge(s) thereof as shown in FIG. 8 in order to shield one or more of bus bars 6–9 from the view of persons viewing the heatable window from the vehicle interior. Instead of including enamel, layer(s) 51 and/or 53 may instead be of or include an opaque organic material such as a black primer.

Following formation of the FIG. 1, 8 heatable window structure, it may be installed into a vehicle to complete a vehicle window assembly. When electric current is run through conductive layer(s) 29 and/or 39 of coating 3 via bus bars 6–9 heat is generated by the electroconductive layer(s) 29 and/or 39 of the coating. This heat may be used to defog the window, defrost the window, and/or melt snow/ice from the window or wipers therefor.

It is noted that the multi-layer coating 3 of FIGS. 6–8 is provided for purposes of example only, and this invention is not so limited. For example, this invention is also applicable to coatings having only one electroconductive layer, as well as to coatings including three or more conductive layers. Different dielectric layers may or may not be used.

In certain example embodiments, vehicle windows according to certain embodiments of this invention may be characterized as follows in Table 5, though the invention is not so limited unless the same is recited in the claims.

TABLE 5

| Color/Transmission After HT; Laminated Form | | |
|---|---|---|
| Characteristic | General | More Preferred |
| $T_{vis}$ (Ill. A, 2 deg.): | >=70% | >=75% |
| $T_{vis}$ (Ill. C, 2 deg.): | >=70% | >=75% |
| $R_gY$ (Ill. A, C; 2 deg.): | <=11% | <=9% |
| $a*_g$ (Ill. A, C; 2°): | -2.0 to +2.0 | -1.0 to +1.0 |
| $b*_g$ (Ill. A, C; 2°): | -10.0 to +1.0 | -8.0 to -2.0 |
| $R_fY$ (Ill. A, C; 2 deg.): | <=11% | <=9% |
| $a*_f$ (Ill. A, C; 2°): | -3.0 to +1.0 | -2.0 to 0.0 |
| $b*_f$ (Ill. A, C; 2°): | -5.0 to 0.0 | -4.0 to -1.0 |
| $R_{solar}$: | <=26% | <=28% |
| Haze: | <=0.4% | <=0.3% |
| $T_{solar}$: | <=50% | <=48% |

Once given the above disclosure many other features, modifications and improvements will become apparent to the skilled artisan. Such other features, modifications and improvements are therefore considered to be a part of this invention, the scope of which is to be determined by the following claims.

What is claimed is:

1. A heatable vehicle window comprising:
   first and second substrates laminated to one another via at least one polymer inclusive interlayer;
   a coating including at least one heatable conductive layer supported by said first substrate and extending across at least a portion of a viewing area of the window;
   a bottom bus bar and first and second different top bus bars, each of said bottom and top bus bars being in electrical communication with said at least one heatable conductive layer; and
   wherein first and second different voltages are applied to said heatable conductive layer via said first and second top bus bars, respectively, in order to heat said heatable conductive layer.

2. The heatable vehicle window of claim 1, wherein a distance d1 across said at least one heatable conductive layer between said bottom bus bar and said first top bus bar is greater than a distance d2 across said at least one heatable conductive layer between said bottom bus bar and said second top bus bar (i.e., d1>d2), and wherein the first voltage applied via said first top bus bar is greater than the second voltage applied via the second top bus bar.

3. The heatable vehicle window of claim 2, wherein the first and second voltages are different in value as a function of a difference between distances d1 and d2.

4. The heatable vehicle window of claim 1, further comprising a third top bus bar in electrical communication with said at least one heatable conductive layer, and wherein a voltage is applied to the conductive layer via the third top bus bar that is different than the second voltage applied via the second top bus bar.

5. The heatable vehicle window of claim 4, wherein as viewed from a central portion of the bottom bus bar, the second top bus bar is at least partially between but vertically offset from the first and third top bus bars, and wherein the second bus bar is closer to the bottom bus bar across the heatable conductive layer than are the first and third top bus bars.

6. The heatable vehicle window of claim 4, wherein said coating is deleted to provide a toll device or rain sensor deletion area at an area behind the second top bus bar relative to the bottom bus bar, so that the second top bus bar is located between the deletion area and the bottom bus bar.

7. A heatable vehicle window comprising:

first and second substrates laminated to one another via at least one interlayer;

a coating including at least one heatable conductive layer supported by said first substrate, a first bus bar located across said coating from a plurality of bus bars so that at least part of a viewing area of the window to be heated is located between at least part of the first bus bar and respective portions of the plurality of bus bars, each of said bus bars being in electrical communication with said at least one conductive layer of the coating; and wherein first and second ones of said plurality of bus bars are used to simultaneously apply different voltages, respectively, across the at least one conductive layer in order to heat said at least one conductive layer.

8. The heatable vehicle window of claim 7, wherein said first bus bar comprises a bottom bus bar, and said first and second ones of said plurality of bus bars comprise top bus bars.

9. The heatable vehicle window of claim 7, wherein said first bus bar comprises a top bus bar, and said plurality of bus bars comprise bottom bus bars.

10. The heatable vehicle window of claim 7, wherein a distance d1 across said at least one conductive layer between said first bus bar and said first one of said plurality of bus bars is greater than a distance d2 across said at least one conductive layer between said first bus bar and said second one of said plurality of bus bars, and wherein the voltage applied to the conductive layer via said first one of said plurality of bus bars is greater than the voltage applied via the second one of the plurality of bus bars.

11. The heatable vehicle window of claim 10, wherein the different voltages applied via the different ones of the plurality of bus bars are different in value as a function of a difference between distances d1 and d2.

12. The heatable vehicle window of claim 7, wherein a first heating zone is defined by said conductive layer between said first bus bar and said first one of said plurality of bus bars, and a second heating zone is defined by said conductive layer between said first bus bar and said second one of said plurality of bus bars, and wherein said first and second heating zones have approximately the same specific power when said first and second voltages are being applied across the conductive layer.

13. The heatable vehicle window of claim 12, wherein said conductive layer is continuous across said first and second heating zones.

14. A method of heating a vehicle window including first and second substrates laminated to one another via at least one interlayer, with at least one heatable conductive layer supported by said first substrate, the method comprising:

applying different voltages across said conductive layer via first and second different bus bars in order to heat at least part of the vehicle window.

15. The method claim 14, wherein said first and second bus bars are both top bus bars, and wherein said first and second different voltages are applied across a viewing area of the window simultaneously.

16. A vehicle window comprising:

a conductive layer supported by a substrate;

wherein a first voltage V1 is applied across the conductive layer via first and second bus bars, and a second voltage V2 is applied across the conductive layer via said first bus bar and a third bus bar; and wherein the second bus bar is spaced further across said conductive layer from said first bus bar than is said third bus bar, and wherein V1>V2.

17. The vehicle window of claim 16, wherein the first and second voltages V1 and V2 are selected in accordance with equation of d2/d1=V2/V1, where d1 is a distance across the conductive layer between the first and second bus bars, and d2 is a distance across the conductive layer between the first and third bus bars.

* * * * *